Aug. 5, 1924.  
B. B. FOGLER  
1,504,036  
METHOD OF PREPARING OXIDES OF TUNGSTEN AND SIMILAR MATERIALS  
Filed Dec. 16, 1920
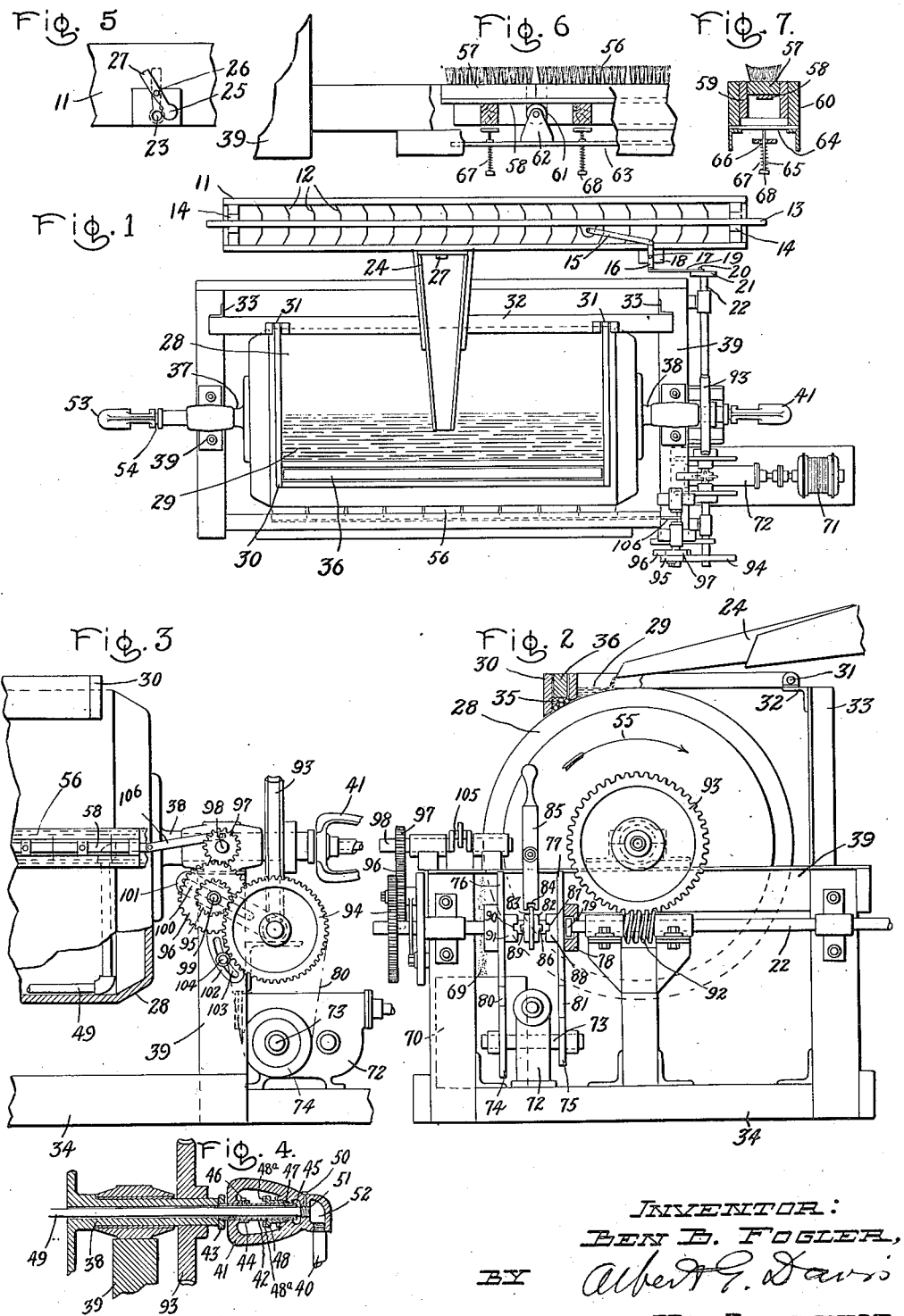
INVENTOR:  
BEN B. FOGLER,  
BY Albert G. Davis  
HIS ATTORNEY.

Patented Aug. 5, 1924.

1,504,036

UNITED STATES PATENT OFFICE.

BEN B. FOGLER, OF CLEVELAND, OHIO, ASSIGNOR TO GENERAL ELECTRIC COMPANY, A CORPORATION OF NEW YORK.

METHOD OF PREPARING OXIDES OF TUNGSTEN AND SIMILAR MATERIALS.

Application filed December 16, 1920. Serial No. 431,092.

*To all whom it may concern:*

Be it known that I, BEN B. FOGLER, a citizen of the United States, residing at Cleveland, in the county of Cuyahoga, State of Ohio, have invented certain new and useful Improvements in Methods of Preparing Oxides of Tungsten and Similar Materials, of which the following is a specification.

My invention has specific application in connection with the continuous process for the production of tungsten oxide which is disclosed in the application of F. M. Dorsey, Serial No. 411,166, filed September 18, 1920, although it will be apparent to those skilled in the art that my invention is not limited thereto in use or application.

In the Dorsey application referred to, a tungsten ore is prepared and mixed with fusion ingredients in a substantially powdered form. The mixture is fused and the fused mixture is subjected to a dissolving reagent to dissolve the tungsten compound formed during the fusion. The solution is filtered and the filtered solution is then treated with an acid to precipitate yellow tungstic oxide. The precipitate is thoroughly washed and then fed preferably to apparatus embodying my invention which evaporates the yellow precipitate to dryness and upon removal from the apparatus the tungstic oxide is secured as a powder.

In the accompanying drawing, Fig. 1 is a top plan view of apparatus for carrying out my invention; Fig. 2 is an enlarged end view of the same; Fig. 3 is an enlarged fragmentary side elevation of the same partially in section; Fig. 4 is a sectional elevation of a detail of the steam supply line; Fig. 5 is a fragmentary front elevation of a detail of the feeding means; Fig. 6 is an enlarged fragmentary plan view of a detail of the means for removing the dried precipitates; and Fig. 7 is a sectional elevation on the line 7—7 of Fig. 6.

The precipitate is washed in a suitable manner, as by means of a settling and washing tank and, after settling, the wash water is drained and sufficient fresh water is added to make a thin paste which is permitted to flow through suitable conducting means from the tank into a trough 11 (Fig. 1), where it is continually agitated to prevent settling by the series of vanes 12 attached to the rod 13 passing along the center of the trough and slidably supported in the guiding slots 14 at each end thereof. The rod 13 is caused to reciprocate and so stir the contents of the trough 11 by the following mechanism. The rod 13 is connected by means of a link 15 to one arm of a crank 16 which is pivoted at 17 on a bracket 18 attached to the trough 11. The other arm of the crank 16 is connected by a link 19 to pin 20 mounted near the periphery of the disc 21 which is fastened to the end of the main driving shaft 22 and driven as more fully described hereinafter, so that a longitudinal motion is imparted through the foregoing mechanism to the rod 13 causing the vanes 12 to move back and forth and so keep the precipitate from settling. The paste flows out of an opening 23 (see Fig. 5) in the side of the trough 11, into an inclined discharge chute 24 attached to the trough. A gate 25 (Fig. 5) pinned to the trough at 26 may be turned by means of the handle 27 over the opening 23 to regulate the amount of the paste fed therethrough.

The chute 24 extends just beyond the center of the top of the hollow drying drum 28 (Fig. 2) where it delivers the fluid paste into a pool 29 formed by a dam 30 resting on the up-turning side of the drum somewhat below the top line thereof. The dam 30 is hinged at 31 to the bar 32 attached to the uprights 33 which are fastened to the bed 34. A series of packing cords 35 held down by the weight 36 is placed between the dam and the drum to prevent leakage on the upcoming side. Packing material is placed between the sides of the dam and the drum to prevent leakage at the ends of the drum. The drum 28 is attached at each end to a hollow shaft 37 and 38 which are suitably carried in bearings in the two end frames 39 mounted on the bed 34. The surface of the drum is preferably enameled to prevent a reaction between the tungstic oxide and the metal of the drum although a bakelite surface may be used with equal success.

In order to dry the paste, steam is passed through the drum in the following manner, the exhaust of the steam from the drum being described first in order to simplify the drawing. The steam enters the left hand side of the drum as shown in Fig. 1 and leaves from the right hand side. The steam exhaust pipe 40 (Fig. 4) is connected, at a right angle, to the outer end of the member 41. The inner end of the member 41 fits over a pipe 42 attached to the cap 43 which is fastened to the end of the hollow shaft 38, the pipe 42 rotating with the shaft 38. A collar 44 is then fitted over the pipe 42 and moved against the inner end of the member 41 until the end of the pipe 42 enters the chamber 45 of the member 41. A set screw 46 in the collar 44 is now tightened to fasten the collar in place. Packing 47 is placed around the pipe 42 and the packing sleeve 48, which is bolted to the member 41 by the bolts 48a, is tightened to compress the packing. A pipe 49 (see also Fig. 3) is screwed into and locked by the set screw 50 in the threaded wall 51 between the chamber 45 and the chamber 52 of the member 41, the pipe 49 passing through the pipe 42 and the hollow shaft 38 into the drum 28 where it turns downward and bends again near the bottom of the drum lying substantially parallel to the bottom of the drum and ending near the middle thereof. Thus the condensation of steam which occurs in the drum 28 is forced through the pipe 49 connected to the member 41 into the chamber 52 and, through the steam exhaust pipe 40 connected thereto, is conducted to a steam trap and then back to the boiler. The drum 28 may be rotated while the member 41 and attached pipe 49 remain stationary, the member 41 being retained on the revolving pipe 42 by the collar 44.

The entrance of the steam to the drum 28 is effected through a member 53 (Fig. 1) similar to the member 41 which is retained by a collar on the rotating pipe 54, similar to the pipe 42, fastened to the end of the hollow shaft 37. A steam supply pipe connected, at a right angle, to the outer end of the member 53 conducts the steam to the member 53 from which it is conducted to the drum 28 by the pipe 54 and the hollow shaft 37 themselves as there is no necessity for a pipe similar to the pipe 49 on the steam entrance end of the drum. Thus the steam enters the drum 28 through the member 53, rotating pipe 54 and hollow shaft 37 and leaves the drum together with the condensed steam through the stationary pipe 49, member 41 and pipe 40.

As the drum 28 is rotated in the direction of the arrow 55 (Fig. 2) by means fully described hereinafter, a layer of the thin paste in the pool formed by the dam 30 is dried on the cylindrical surface of the drum. This dried layer of paste is removed from the drum as a fine powder by a stiff-bristled brush 56 (Figs. 1, 3 and 6) which is caused to reciprocate transversely to the direction of rotation of the drum by driving means described hereinafter. In order to make the brush 56 flexible enough to work over any irregularities in the surface of the drum the following construction is used. The brush 56 is made of a series of short brushes 57 whose backs are attached to the flexible metal member 58. To the back and sides of each brush 57 is attached an H-shaped block 59 which slides in a frame 60 carried by the two end frames 39 previously described. Bearing against the member 58 is a series of rollers 61 carried in supports 62 which are attached to the bar 63. The bar 63 is carried by the frame 60 in the following manner. To each one of the upright members 64 which are attached to the frame 60 of which there is a series corresponding to the series of short brushes 57, is fastened a long bolt 65 which extends through a hole 66 in the bar 63. A spring 67 is placed over the projecting end of the bolt 65 and a nut 68 is screwed on the bolt to compress the spring 67 and tend to force the bar 63 toward the frame 60. This pressure is communicated through the rollers 61 to the member 58 and so to the brush 56 which is thus firmly held against the drum 28. The pressure of the brush 56 against the drum 28 may be regulated by adjusting the nuts 68. The powder 69 removed from the drum 28 by the brush 56 falls into a suitable container 70.

The driving means for all of the moving parts of the apparatus comprises the following parts: The motor 71 transmits its power to a speed reducer 72 (Figs. 1, 2 and 3) which has a driving shaft 73 at one end of which is a large sprocket 74 and at the other end a small sprocket 75 so that the two speeds may be obtained directly from the reducer. The main driving shaft 22, previously mentioned, is suitably carried on the right hand (of Fig. 1) end frame 39 and is in alignment with the sprockets 74 and 75. It has two similar sprockets 76 and 77 each of which is composed of two halves with recessed hub 78 which are bolted together over a collar 79 (Fig. 2) fastened to the shaft 22, the collar 79 serving to maintain the alignment of the respective sprockets which are normally free to rotate. Driving chains 80 and 81 serve to connect the sprockets 74 and 75 with the sprockets 76 and 77 respectively. Slidably keyed to the shaft 22 is a member 82 with a central ring 83 engaged by a slot 84 in the end of the lever 85 pivoted on the end frame 39. As the member 82 is moved to the right by means of the lever 85, a projection 86 in the face of the member 82 engages a slot 87 in the hub 88 of the sprocket 77 causing the motion of the sprocket 77 to be communicated to the shaft 22. Similarly, as the member 82 is moved to the left, a projection 89 in the face of the member 82 engages a slot 90 in the hub 91 of the sprocket 76 causing the motion of the sprocket 76 to be communicated to the shaft 22. This provides two speeds for the shaft 22.

Through a worm 92 mounted thereon the shaft 22 drives the worm wheel 93 which is fastened to the hollow shaft 38 previously described. The shaft 22 through the disc 21, link 19, crank 16 and link 15 drives the rod 13 as previously set forth.

The brushing mechanism is driven as follows: At the left end (Fig. 2) of the driving shaft 22 is fastened a gear 94 which drives a gear 95 (Fig. 3) which has a gear 96 attached thereto and driving the gear 97 on the shaft 98 mounted on the end frame 39. The gear 95 and attached gear 96 are mounted on a pin 99 which is fastened in a slot 100 of the radial arm 101 which is centered by the shaft 22 and which has attached a sector arm 102 with a slot 103 which receives a bolt 104 mounted in the end frame 39 so as to lock the sector arm 102 in position. This construction is utilized to permit the gear 95 and attached gear 96 to be removed and another combination of gears to be substituted so that the speed of the shaft 98 may be changed. The shaft 98 has a crank 105 which receives one end of the connecting rod 106 whose other end is pinned to the end of the metal member 58 of the brush 56 previously described.

In operation, the precipitate is made into a paste in the settling and washing tank and allowed to flow into the trough 11 where it is constantly stirred by the vanes 12. The paste is then fed through the opening 23 to the discharge chute 24 which delivers it to the pool 29 formed by the dam 30 and the drum 28, the drum 28 having previously been brought up to a proper temperature by the steam from the steam supply pipe. The drum 28, being rotated as described, gathers a thin layer of precipitate which it quickly dries. The dried precipitate is brushed off the drum 28 by the reciprocating brush 56 and falls as a fine powder 69 into a suitable container 70.

While I have described a species of my invention, I do not wish to be limited thereto as various modifications will readily suggest themselves to those skilled in the art. I have described my invention in connection with a precipitate of tungstic oxide, but it should be obvious that any similar precipitate or finely divided material may be successfully handled.

What I claim as new and desire to secure by Letters Patent of the United States is:—

1. The method of preparing finely divided oxide of tungsten and similar material which consists in making a paste of the said material, continuously feeding said paste to a heated surface and continuously removing the dried powder thus formed from said surface.

2. The method of preparing finely divided oxide of tungsten and similar material which consists in making a paste of the said material, continuously feeding said paste while agitating the same to a heated surface, and continuously removing the dried powder thus formed from said surface.

In witness whereof, I have hereunto set my hand this thirteenth day of December, 1920.

BEN B. FOGLER.